US011461202B2

(12) United States Patent
Ouyang et al.

(10) Patent No.: US 11,461,202 B2
(45) Date of Patent: Oct. 4, 2022

(54) REMOTE DATA REPLICATION METHOD AND SYSTEM

(71) Applicant: Huawei Technologies Co., Ltd., Shenzhen (CN)

(72) Inventors: Ji Ouyang, Changsha (CN); Huabing Yan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 112 days.

(21) Appl. No.: 16/990,607

(22) Filed: Aug. 11, 2020

(65) Prior Publication Data

US 2020/0371884 A1   Nov. 26, 2020

Related U.S. Application Data

(63) Continuation of application No. 16/263,818, filed on Jan. 31, 2019, now Pat. No. 10,795,788, which is a (Continued)

(30) Foreign Application Priority Data

Sep. 5, 2016 (CN) .......................... 201610801665.1

(51) Int. Cl.
*G06F 3/06* (2006.01)
*G06F 11/20* (2006.01)
(Continued)

(52) U.S. Cl.
CPC .......... *G06F 11/2069* (2013.01); *G06F 11/00* (2013.01); *G06F 11/2035* (2013.01);
(Continued)

(58) Field of Classification Search
CPC ...... G06F 3/0646; G06F 3/0647; G06F 3/065; G06F 11/2069; G06F 11/2035; G06F 11/2082; G06F 11/2094; G06F 11/00
See application file for complete search history.

(56) References Cited

U.S. PATENT DOCUMENTS 6,643,795 B1   11/2003  Sicola et al.
7,966,293 B1    6/2011  Owara et al.
(Continued)

FOREIGN PATENT DOCUMENTS

CN       1578949 A     2/2005
CN     102722405 A    10/2012
(Continued)

OTHER PUBLICATIONS

S. Nakamura, K. Nakayama and T. Nakagawa, "Optimal backup interval of database by incremental backup method," 2009 IEEE International Conference on Industrial Engineering and Engineering Management, 2009, pp. 218-222. (Year: 2009) (Year: 2009).*

(Continued)

*Primary Examiner* — Khoa D Doan
(74) *Attorney, Agent, or Firm* — Conley Rose, P.C.

(57) ABSTRACT

A remote data replication method and a storage system, where a production array sends a data replication request to a disaster recovery array. The data replication request includes an identifier of a source object and a data block corresponding to the source object. The data block is stored in physical space of a hard disk of the production array. The disaster recovery array receives the data replication request. The disaster recovery array creates a target object when the disaster recovery array does not include an object having a same identifier as the source object. An identifier of the target object is the same as the identifier of the source object, the disaster recovery array writes the data block into the physical space.

20 Claims, 4 Drawing Sheets

Related U.S. Application Data continuation of application No. PCT/CN2017/081347, filed on Apr. 21, 2017.

(51) Int. Cl.

| | | |
|---|---|---|
| *G06F 11/00* | (2006.01) | |
| *H04L 67/06* | (2022.01) | |
| *H04L 67/1095* | (2022.01) | |
| *G06F 16/901* | (2019.01) | |
| *H04L 69/40* | (2022.01) | |

(52) U.S. Cl.
CPC ...... *G06F 11/2082* (2013.01); *G06F 11/2094* (2013.01); *G06F 16/9017* (2019.01); *H04L 67/06* (2013.01); *H04L 67/1095* (2013.01); *H04L 69/40* (2013.01); *G06F 3/065* (2013.01); *G06F 3/0646* (2013.01); *G06F 3/0647* (2013.01); *G06F 2201/84* (2013.01)

(56) References Cited

U.S. PATENT DOCUMENTS

| | | | |
|---|---|---|---|
| 8,321,380 | B1 | 11/2012 | Leverett et al. |
| 8,655,848 | B1 | 2/2014 | Leverett et al. |
| 9,779,153 | B2 | 10/2017 | Jernigan, IV et al. |
| 9,811,430 | B1* | 11/2017 | Bezbaruah .......... G06F 11/1471 |
| 10,042,711 | B1 | 8/2018 | Chopra et al. |
| 10,042,719 | B1 | 8/2018 | Chopra et al. |
| 10,069,914 | B1* | 9/2018 | Smith ................... H04L 67/568 |
| 10,564,884 | B1* | 2/2020 | Colgrove ............ G11C 11/4074 |
| 10,620,843 | B2 | 4/2020 | Dekoning et al. |
| 2003/0046260 | A1 | 3/2003 | Mahadev et al. |
| 2003/0149699 | A1 | 8/2003 | Tsao |
| 2005/0027819 | A1 | 2/2005 | Nakano et al. |
| 2005/0154848 | A1 | 7/2005 | Itoh et al. |
| 2006/0031647 | A1 | 2/2006 | Hirakawa et al. |
| 2006/0075200 | A1 | 4/2006 | Satoyama et al. |
| 2006/0101217 | A1 | 5/2006 | Maki et al. |
| 2006/0218365 | A1 | 9/2006 | Osaki et al. |
| 2007/0118576 | A1* | 5/2007 | Moore ................... G06F 16/184 |
| 2008/0243878 | A1 | 10/2008 | De Spiegeleer et al. |
| 2009/0132615 | A1 | 5/2009 | Shinozaki |
| 2009/0132775 | A1* | 5/2009 | Otani ................... G06F 11/1464 |
| | | | 711/E12.103 |
| 2009/0187722 | A1 | 7/2009 | Iwamura et al. |
| 2010/0179941 | A1 | 7/2010 | Agrawal et al. |
| 2012/0017059 | A1 | 1/2012 | Gold et al. |
| 2012/0265956 | A1 | 10/2012 | Nakamichi et al. |
| 2014/0351538 | A1 | 11/2014 | Taiki et al. |
| 2015/0113317 | A1 | 4/2015 | Ouyang et al. |
| 2016/0259574 | A1* | 9/2016 | Carpenter ............. G06F 3/0683 |
| 2018/0121459 | A1 | 5/2018 | Sergeev et al. |
| 2018/0373887 | A1 | 12/2018 | Smith |

FOREIGN PATENT DOCUMENTS

| | | |
|---|---|---|
| CN | 103500129 A | 1/2014 |
| CN | 103649901 A | 3/2014 |
| CN | 103793291 A | 5/2014 |
| CN | 106407040 A | 2/2017 |
| EP | 0950954 A1 | 10/1999 |

OTHER PUBLICATIONS

L. Zeng, D. Feng, B. Veeravalli and Q. Wei, "Array: A Non-application-Related, Secure, Wide-Area Disaster Recovery Storage System," 2009 IEEE International Symposium on Parallel and Distributed Processing with Applications, 2009, pp. 245-252, doi: 10.1109/ISPA.2009.54. (Year: 2009).*

Valente, S., et al., "Replicated Grid Resource," 2011 IEEE/ACM 12th International Conference on Grid Computing, Lyon, 2011, pp. 198-206.

* cited by examiner

REMOTE DATA REPLICATION METHOD AND SYSTEM

CROSS-REFERENCE TO RELATED APPLICATIONS

This application is a continuation of U.S. patent application Ser. No. 16/263,818, filed on Jan. 31, 2019, which is a continuation of International Patent Application No. PCT/CN2017/081347 filed on Apr. 21, 2017, which claims priority to Chinese Patent Application No. 201610801665.1 filed on Sep. 5, 2016. The disclosures of the aforementioned applications are hereby incorporated by reference in their entireties.

TECHNICAL FIELD

Embodiments of the present disclosure relate to the field of storage technologies, and in particular, to a remote data replication method and a system.

BACKGROUND

Data redundancy, also referred to as a remote data replication technology, is to establish a remote data system, and the system is available replication of local data. When a disaster occurs on the local data and an entire application system, the system stores at least one piece of available mission-critical service data in a remote area.

A typical data redundancy system includes a production center and a disaster recovery center. In the production center, a host and a storage array are deployed for normal service operation. In the disaster recovery center, a host and a storage array are deployed, and are used to take over a service of the production center after a disaster occurs in the production center. In some application scenarios, storage arrays of the production center and the disaster recovery center include a file system. After data produced by the service of the production center is written into the production array, the data may be replicated to the disaster recovery center using a redundancy link and may be written into the disaster recovery array. In other approaches, remote data replication is based on block semantics. To be specific, during the replication, all data in a hard disk of the production array may be directly replicated to the disaster recovery array without considering an upper layer file of a data block. The data not only includes service data, but also includes metadata that describes the service data, for example, an attribute of the service data and a physical layout of the service data in the hard disk. This causes heavy load on the redundancy link.

SUMMARY

Embodiments provide a remote data replication method and a storage system in order to reduce load of a redundancy link between a production array and a disaster recovery array.

According to a first aspect, a remote data replication method is provided. In the method, a production array sends a data replication request to a disaster recovery array. The data replication request includes an identifier of a source object and a data block corresponding to the source object, the source object includes a data container used to carry a file or a directory, the data block is stored in physical space of a hard disk of the production array, and an address of the data block stored in the physical space of the production array is a source physical address. The disaster recovery array receives the data replication request, and creates a target object when the disaster recovery array does not include an object having a same identifier as the source object. The target object corresponds to one or more segments of physical space of a hard disk of the disaster recovery array, and an identifier of the target object is the same as the identifier of the source object. The disaster recovery array writes the data block into the physical space, an address of the data block stored in the physical space is a target physical address, and the target physical address is different from the source physical address.

Using the remote data replication method provided in the first aspect of this embodiment, the production array sends the identifier of the source object and the data block corresponding to the source object to the disaster recovery array. If the object having the same identifier as the source object is not included, the disaster recovery array creates the target object and writes the data block corresponding to the source object into the target object. The writing the data block into the target object is writing the data block into the physical space corresponding to the target object. Different from the other approaches, in this embodiment, a physical address of the data block stored in the disaster recovery array is different from a physical address of the data block stored in the production array. Therefore, the disaster recovery array is relatively flexible in storing the data block, and the production array does not need to replicate, to the disaster recovery array, data describing the physical address of the data block stored in the production array, and a correspondence between the physical address of the data block in the production array and the identifier of the object, saving bandwidth overheads between the production array and the disaster recovery array.

In addition, the first aspect may be further implemented in another manner. For example, the identifier of the target object is different from the identifier of the source object, and after allocating the identifier to the target object, the disaster recovery array stores a correspondence between the identifier of the target object and the identifier of the source object, and then sends the correspondence to the production array. In this manner, the disaster recovery array may create the target object more flexibly, without requiring that the identifier of the target object be the same as the identifier of the source object.

In a specific implementation of the first aspect, the data replication request further includes a logical address of the data block, the logical address is a location of the data block in the source object, and a location of the data block stored in the target object is the same as the location of the data block in the source object.

In the foregoing specific implementation, the disaster recovery array stores a correspondence between the logical address and the target physical address and a correspondence between the identifier of the target object and the target physical address, where the correspondence between the logical address and the target physical address is different from a correspondence between the logical address and the source physical address, and the correspondence between the identifier of the target object and the target physical address is different from a correspondence between the identifier of the source object and the source physical address. The correspondence between the logical address and the target physical address is different from the correspondence between the logical address and the source physical address, and the correspondence between the identifier of the target object and the target physical address is different from the correspondence between the identifier of the source object and the source physical address. Therefore, the disaster recovery array may relatively flexibly lay out the target object in the hard disk. The production array does not need to send data describing these correspondences to the disaster recovery array, reducing link load.

In any one of the foregoing specific implementations, the production array sends an incremental data replication request to the disaster recovery array, where the incremental data replication request includes incremental data and address information of the incremental data, the incremental data is a data block used to update the data block, and the address information of the incremental data includes the identifier of the source object and the logical address. When updating the data block in the source object, the production array needs to send the incremental data used to update the data block to the disaster recovery array such that the disaster recovery array synchronously updates the target object.

In the foregoing specific implementation, the disaster recovery array receives the incremental data replication request, determines, based on the identifier of the source object in the address information of the incremental data, that an object corresponding to the incremental data is the target object, determines, based on the logical address in the address information of the incremental data, a location in the target object into which the incremental data is to be written, and writes the incremental data into the logical address of the target object. Therefore, the disaster recovery array updates the target object. In addition, when sending the incremental data to the disaster recovery array, the production array does not need to send, to the disaster recovery array, metadata that describes how to lay out the incremental data on the hard disk. Instead, the disaster recovery array regenerates the layout metadata when writing the incremental data. Therefore, bandwidth overheads between a production array end and a disaster recovery array end are saved.

A second aspect of the embodiments further provides a storage system, including a production array and a disaster recovery array, which are separately configured to perform the remote data replication method in the first aspect.

A third aspect of the embodiments further provides a storage device, including a controller and a hard disk, and a source file system and a target file system are constructed on the hard disk, where the source file system includes a source object, the source object includes a data container used to carry a file or a directory, a data block corresponding to the source object is stored in physical space corresponding to the source file system, and an address of the data block corresponding to the source object stored in the physical space is a source physical address. When determining that the target file system does not include an object having a same identifier as the source object, the controller is configured to create a target object, and allocate physical space in the physical space corresponding to the target file system to the target object. An identifier of the target object is the same as an identifier of the source object. The controller writes the data block into the physical space allocated to the target object, an address of the data block stored in the physical space allocated to the target object is a target physical address, and the target physical address is different from the source physical address.

In addition, the third aspect may be further implemented in another manner. For example, the identifier of the target object is different from the identifier of the source object, and after allocating the identifier to the target object, the controller stores a correspondence between the identifier of the target object and the identifier of the source object.

In a specific implementation of the third aspect, the controller is further configured to write, based on a logical address of the data block in the source object, the data block into the physical space allocated to the target object, and a location of the data block stored in the target object is the same as a location of the data block in the source object.

A fourth aspect of the embodiments further provides a data backup method, used in the storage device provided in the third aspect.

BRIEF DESCRIPTION OF DRAWINGS

To describe the technical solutions in some of the embodiments of the present disclosure more clearly, the following briefly describes the accompanying drawings describing some of the embodiments.

DESCRIPTION OF EMBODIMENTS

Embodiments of the present disclosure provide a remote data replication method and a system in order to reduce load of a redundancy link between a production array and a disaster recovery array.

Figure 1:
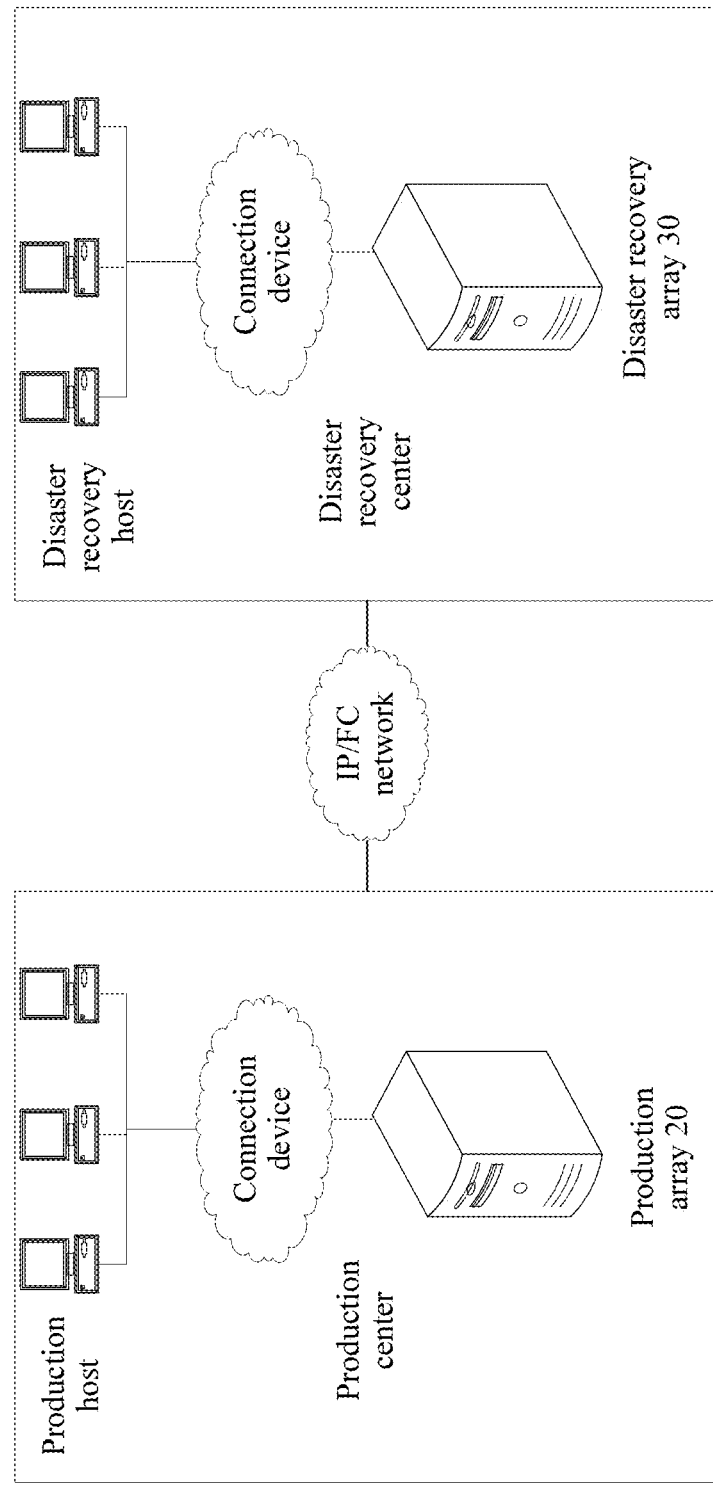
FIG. 1 is a schematic diagram of a system architecture according to an embodiment of the present disclosure.

FIG. 1 is a schematic diagram of a system architecture of a remote data replication method according to an embodiment of the present disclosure. As shown in FIG. 1, a production center includes a production host, a connection device, and a production array 20. A system architecture of a disaster recovery center is similar to that of the production center, including a disaster recovery host, a connection device, and a disaster recovery array 30. In this embodiment of the present disclosure, there may be more than one disaster recovery center. The production center and the disaster recovery center may transmit data using an Internet Protocol (IP) or a fiber channel (FC) or another protocol. There may be a control center between the production center and the disaster recovery center, and the control center may be deployed on a production center side, or may be deployed on a disaster recovery center side, or may be deployed in a third party device between the production center and the disaster recovery center. The control center is configured to send a signal to the disaster recovery array 30 to enable the disaster recovery array 30 to take the place of the production array 20 to process a host service when the production array 20 is faulty.

Both the production host and the disaster recovery host may be any computing device such as a server or a desktop computer. An operating system and another application program are installed inside a host.

The connection device may be any interface between a storage device and the host, such as an FC switch, or another switch that is known in a current technology.

Both the production array 20 and the disaster recovery array 30 may be the storage device, for example, a redundant array of independent disks (RAID), a just a bundle of disks (JBOD), and one or more interconnected hard disk drives of a direct access storage device (DASD), such as a tape library, and a tape storage device having one or more storage units.

Both the production array 20 and the disaster recovery array 30 in this embodiment are storage devices that have a file system, to be specific, data stored in a storage medium is managed and accessed on a per-file basis. The file system is a method for storing and organizing the data, and makes it easy to access and search for the data, and the file system uses abstract logical concepts of the file and a tree directory to replace a concept of a data block used by a physical device such as a hard disk. After the production array 20 uses the file system to store the data, a user does not need to be concerned about a specific address of the data block of the hard disk in which the data is actually stored, and only needs to remember a directory and a file name of the file. Likewise, before new data is written, the user does not need to be concerned that this block address in the hard disk is not used, a storage space management (allocation and release) function in the hard disk is automatically completed by the file system, and the user only needs to remember which file the data is written into. It should be noted that although the data stored in the production array 20 is presented to the user in file form, the file is still stored per data block in a hard disk. Therefore, one file may include a plurality of data blocks. In addition, this embodiment introduces a concept of an "object", and the object is a container used to store the file or a directory. Each object has a unique identifier (also referred to as ID) in the file system.

Figure 2:
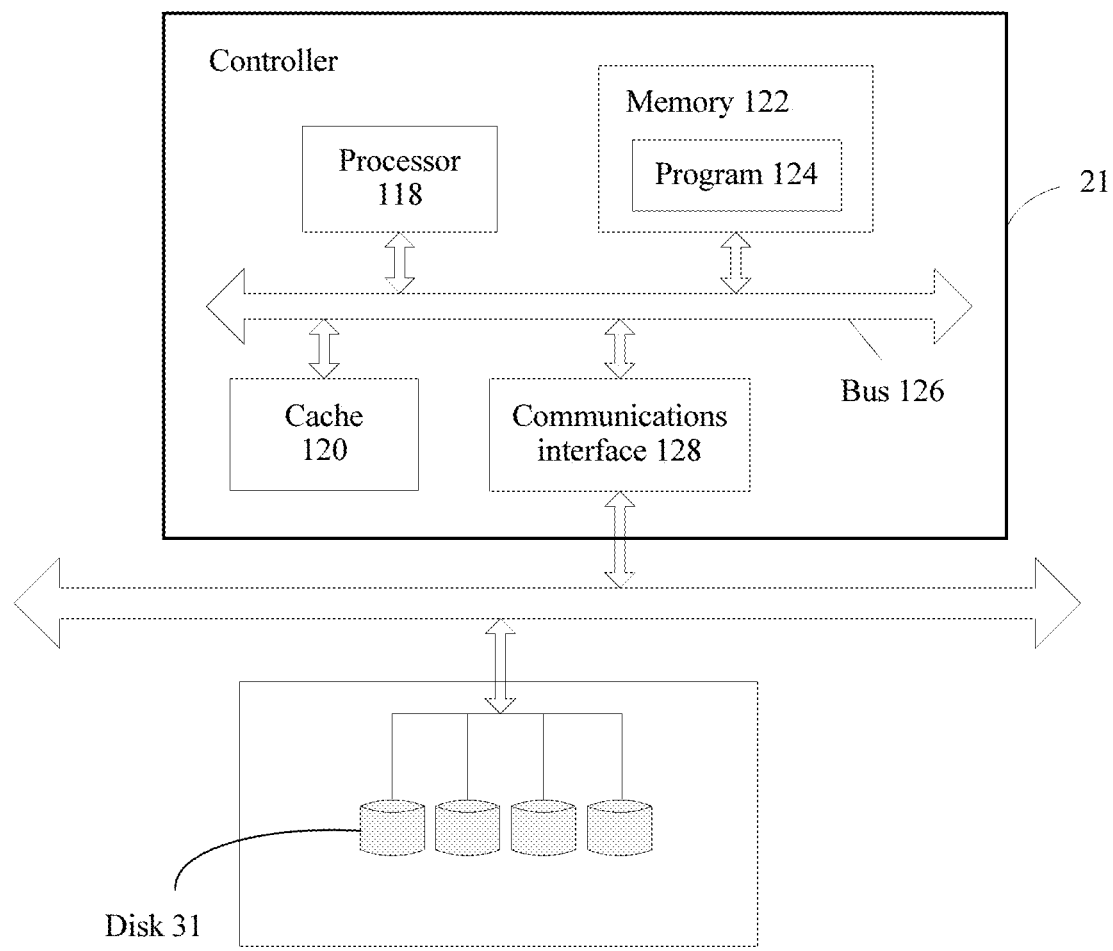
FIG. 2 is a structural diagram of a production array according to an embodiment of the present disclosure.
Figure 3:
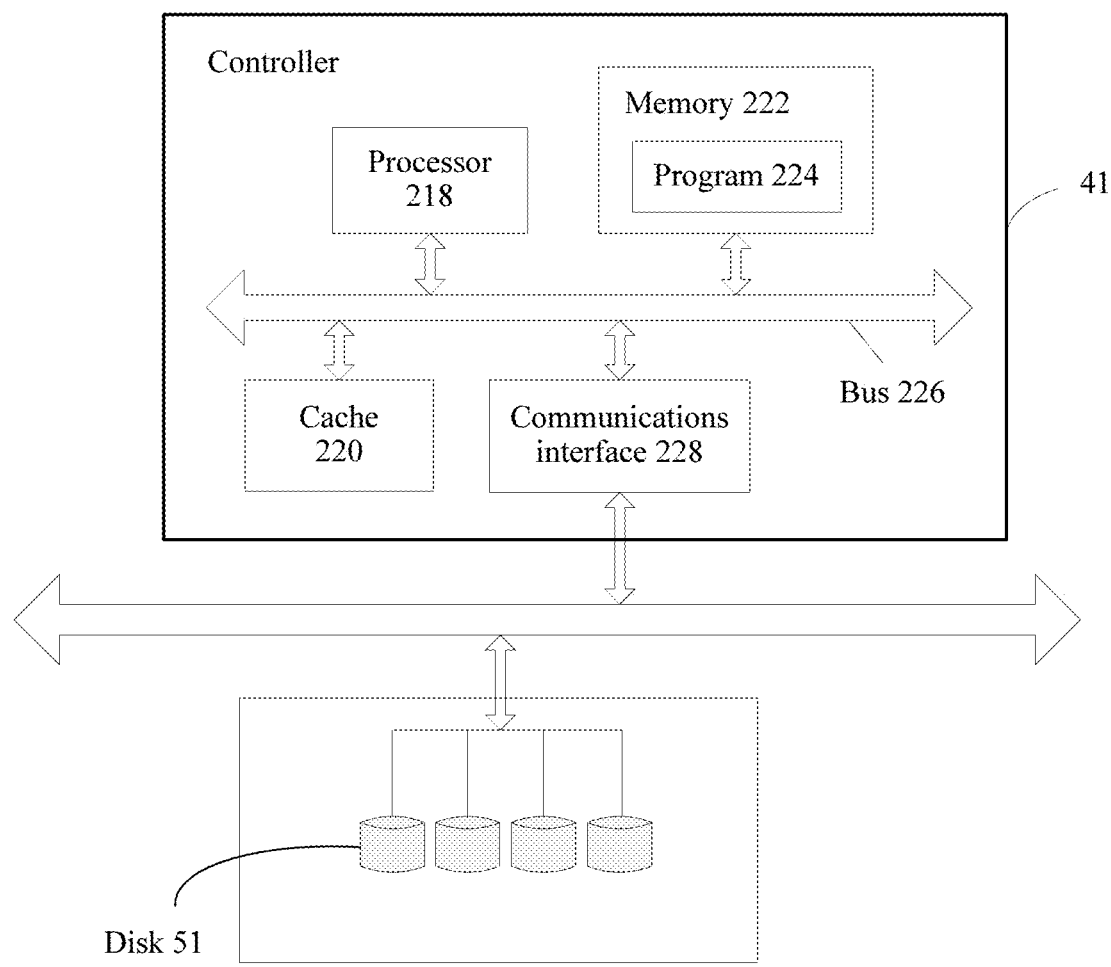
FIG. 3 is a structural diagram of a disaster recovery array according to an embodiment of the present disclosure.

Hardware structures of the production array 20 and the disaster recovery array 30 are the same. FIG. 2 is a schematic structural diagram of a production array 20 according to an embodiment of the present disclosure. FIG. 3 is a schematic structural diagram of a disaster recovery array 30 according to an embodiment of the present disclosure.

As shown in FIG. 2, the production array 20 includes a controller 21 and several hard disks 31. The controller 21 may include any computing device such as a server or a desktop computer. A file system and another application program are installed inside the controller 21. The controller 21 is configured to perform various object related operations, for example, creating a file, creating a directory, a file reading operation, a file writing operation, and sending a data replication request. Several hard disks 31 included in the production array 20 are configured to provide storage space to store the file.

The controller 21 mainly includes a processor 118, a cache 120, a memory 122, a communications bus (designated as a bus) 126, and a communications interface 128. The processor 118, the cache 120, the memory 122, and the communications interface 128 implement mutual communication using the communications bus 126.

The communications interface 128 is configured to communicate with a production host, a disaster recovery array, and a hard disk 31.

The memory 122 is configured to store a program 124, and the memory 122 may include a high-speed random access memory (RAM), and may further include a non-volatile memory, for example, at least one hard disk memory. It may be understood that the memory 122 may be a non-transitory machine-readable medium capable of storing program code, for example, a RAM, a magnetic disk, a hard disk, an optical disc, a solid state disk (SSD), or the non-volatile memory.

The program 124 may include program code, and the program code includes the file system and other program code described above.

The cache 120 is configured to cache data received from the production host or data read from the hard disk. The cache 120 may be a non-transitory machine-readable medium capable of storing data, for example, a RAM, a read-only memory (ROM), a flash memory, or an SSD. This is not limited herein.

In addition, the memory 122 and the cache 120 may be disposed together or separately, and this is not limited in this embodiment of the present disclosure.

The processor 118 may be a central processing unit (CPU), or an application-specific integrated circuit (ASIC), or one or more integrated circuits configured to implement this embodiment of the present disclosure.

As shown in FIG. 3, the disaster recovery array 30 includes a controller 41 and several hard disks 51. The controller 41 may include any computing device such as a server or a desktop computer. A file system and another application program are installed inside the controller 41. The controller 41 is configured to perform various object related operations, for example, creating a file, creating a directory, a file reading operation, and a file writing operation. Several hard disks 51 included in the disaster recovery array 30 are configured to provide storage space to store the file.

The controller 41 mainly includes a processor 218, a cache 220, a memory 222, a communications bus (designated as a bus) 226, and a communications interface 228. The processor 218, the cache 220, the memory 222, and the communications interface 228 implement mutual communication using the communications bus 226.

The communications interface 228 is configured to communicate with a production array, a disaster recovery host, and a hard disk 51.

The memory 222 is configured to store a program 224, and the memory 222 may include a high-speed RAM, and may further include a non-volatile memory, for example, at least one hard disk memory. It may be understood that the memory 222 may be a non-transitory machine-readable medium capable of storing program code, for example, a RAM, a magnetic disk, a hard disk, an optical disc, an SSD, or the non-volatile memory.

The program 224 may include program code, and the program code includes the file system and other program code described above.

The cache 220 is configured to cache data received from the production array or data read from the hard disk. The cache 220 may be a non-transitory machine-readable medium capable of storing data, for example, a RAM, a ROM, a flash memory, or an SSD. This is not limited herein.

In addition, the memory 222 and the cache 220 may be disposed together or separately, and this is not limited in this embodiment of the present disclosure.

The processor 218 may be a CPU, or an ASIC, or one or more integrated circuits configured to implement this embodiment of the present disclosure.

Figure 4:
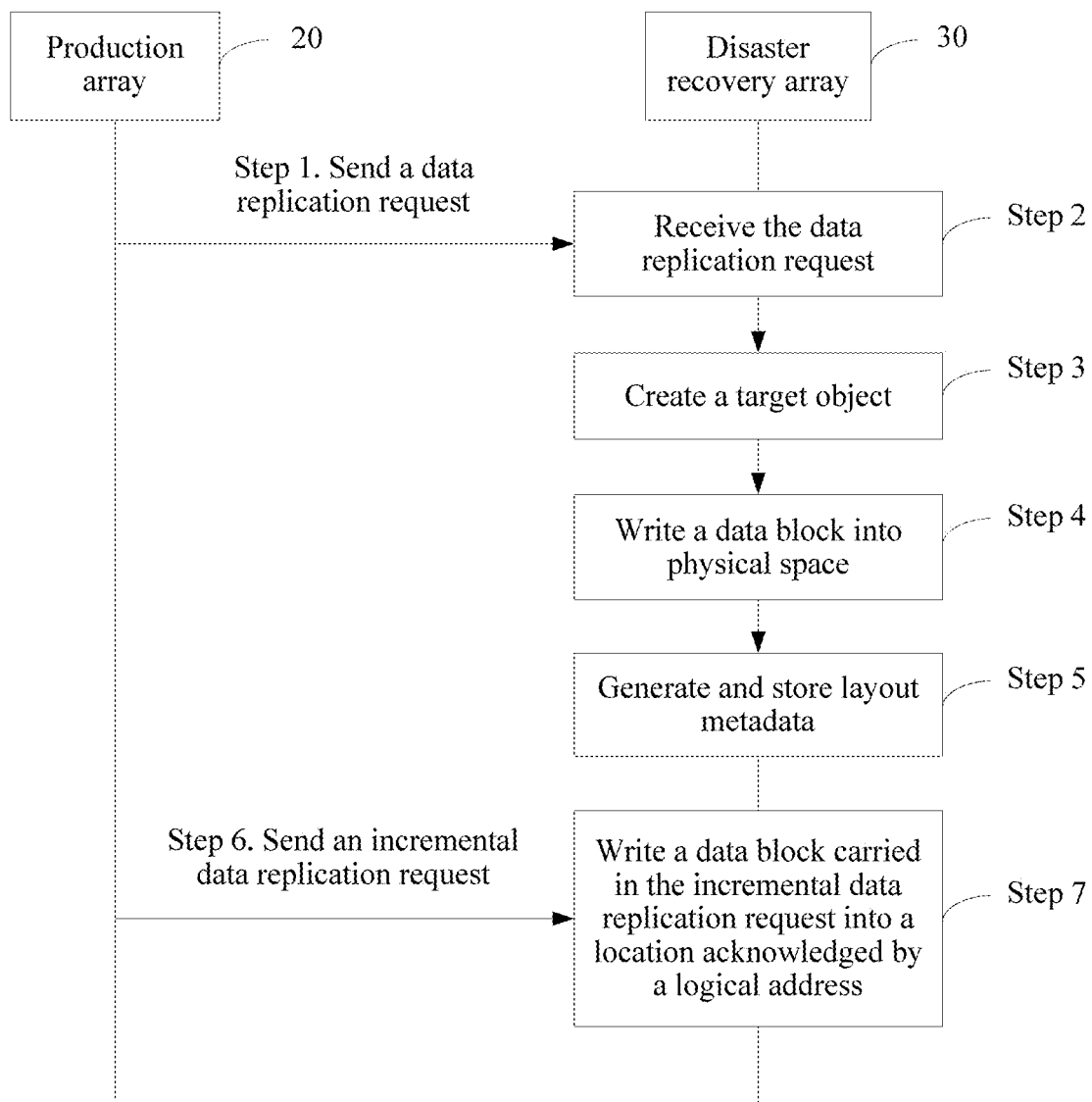
FIG. 4 is a schematic flowchart of a remote data replication method according to an embodiment of the present disclosure.

With reference to FIG. 1, FIG. 2, and FIG. 3, FIG. 4 describes a remote data replication method according to an embodiment of the present disclosure. The method is applied to an asynchronous remote replication scenario shown in FIG. 1, and is performed by a production array 20 and a disaster recovery array 30. As shown in FIG. 4, the method may include the following steps.

Step 1. A production array 20 sends a data replication request to a disaster recovery array 30. The data replication request includes an ID of an object and a data block corresponding to the object.

The object is a data container used to carry a file or a directory. The object corresponds to one or more segments of physical space in a hard disk 31 of the production array 20. It may be understood that writing the data block corresponding to the object into the object is actually writing the data block into the physical space. However, for an external device, the physical space is invisible, and the data block can only be seen in a data container. In this embodiment, an address of the data block that is written into the physical space is referred to as a physical address. It should be noted that the physical address in this embodiment is not necessarily an actual address of the data block in the hard disk, and provided that an address is shielded from an external device and reflects the physical space, the address is referred to as the physical address. Corresponding to the physical address, the data block further has a logical address. The logical address is an address that can be accessed by the external device and reflects a location of the data block in the object. Metadata of the object may include the ID of the object, the logical address of the data block corresponding to the object, the physical address of the data block, a correspondence between the ID of the object and the physical address, and a correspondence between the logical address and the physical address. In an actual application, if an object is relatively large, the object may also correspond to several segments of physical space in the hard disk 31.

Because both the production array 20 and the disaster recovery array 30 store the object, to distinguish objects stored at both ends, in this embodiment, an object in the production array 20 is referred to as a source object, and an object in the disaster recovery array 30 is referred to as a target object. Likewise, a logical address of the source object is referred to as a source logical address, a physical address of the source object is referred to as a source physical address, a logical address of the target object is referred to as a target logical address, and a physical address of the target object is referred to as a target physical address.

In addition, remote data replication described in this embodiment is asynchronous remote replication. The production array 20 periodically sends the data replication request to the disaster recovery array 30, and a remote replication period may be set in a control center. For example, a timer is set in the control center. When a preset time arrives, the control center sends an instruction to the production array 20 to instruct the production array 20 to execute a data replication task.

In step 1, the data replication request that is sent by the production array 20 to the disaster recovery array 30 may include the ID of the object and the data block corresponding to the object. In some implementations, the data replication request may further include the logical address of the data block. It should be noted that the production array 20 does not need to send layout metadata of the data block to the disaster recovery array 30. The layout metadata of the data block is a source physical address of the data block, a correspondence between an ID of the source object and the source physical address, and a correspondence between the source logical address and the source physical address. This means that after receiving the data block, the disaster recovery array 30 does not need to store the data block in a layout manner that is the same as a layout manner of the production array 20. A target physical address of the data block stored in the disaster recovery array 30 is different from a source physical address of the data block stored in the production array 20.

Further, step 1 may be performed by a processor 118 in the production array 20.

Step 2. The disaster recovery array 30 receives the data replication request. The disaster recovery array 30 may determine, based on the ID of the object carried in the data replication request, whether an object having a same ID as the source object locally exists. If the object having the same ID exists, the data replication request is an incremental data replication request, and then step 6 is performed. The incremental data replication request is used to update the object. If a determining result is that the object having the same ID does not exist, the disaster recovery array 30 needs to create a target object based on the data replication request, as shown in step 3.

Step 3. The disaster recovery array 30 creates the target object. An ID of the target object may be the same as or different from the ID of the source object. If IDs are the same, both the production array 20 and the disaster recovery array 30 relatively more easily find the target object corresponding to the source object, or the source object corresponding to the target object. If IDs are different, after setting the ID of the target object, the disaster recovery array 30 further needs to store a correspondence between the ID of the source object and the ID of the target object, and notify the production array 20 of the correspondence. In this manner, although searching is relatively complex, the disaster recovery array 30 creates the target object more flexibly. Therefore, each of them has an advantage. In addition, it can be learned from the foregoing description of the object that, the target object is the data container logically used to carry the file or the directory, and corresponds to the one or more segments of the physical space in the hard disk of the disaster recovery array 30. The physical space is allocated to the target object when the target object is created.

Step 4. The disaster recovery array 30 writes, into the physical space, a data block carried in the data replication request. An address of the data block stored in the physical space stored is the target physical address, and the target physical address is different from the source physical address.

Further, the data replication request that is sent by the production array 20 to the disaster recovery array 30 may further include the logical address of the data block. The logical address is applicable to both the production array 20 and the disaster recovery array 30. This means that a location of the data block in the source object is the same as a location of the data block in the target object. Therefore, when writing the data block into the physical space, the disaster recovery array 30 may write the data block into the physical space based on the logical address of the data block. It may be understood that physical space actually occupied by the data block may be a part or all of the physical space allocated to the target object.

Step 5. After writing the data block into the physical space, the disaster recovery array 30 generates and stores layout metadata of the data block. The layout metadata includes a correspondence between the ID of the target object and the target physical address, and a correspondence between the logical address and the target physical address. Because the target physical address is different from the source physical address, correspondingly, layout metadata of a disaster recovery array end is different from layout metadata of a production array end.

After step 5 is performed, the disaster recovery array 30 may send a response request to the production array 20 in order to indicate that the data replication request is successfully performed. So far, in this embodiment, the object in the production array and the data block corresponding to the object are replicated into the disaster recovery array. The target physical address of the data block stored in the disaster recovery array 30 is different from the source physical address of the data block stored in the production array 20, and the production array 20 does not need to instruct the disaster recovery array 30 to store the physical address of the data block. Therefore, the production array 20 does not need to send the layout metadata to the disaster recovery array 30, thereby saving bandwidth overheads between the production array and the disaster recovery array.

Further, step 2 to step 5 may be performed by a processor 218 in the disaster recovery array 30.

The following describes how to process the incremental data replication request.

In step 2, if the disaster recovery array 30 determines that the target object already exists, the data replication request in step 2 is the incremental data replication request. In addition, after step 5, in step 6 (i.e., after the target object is created), the disaster recovery array 30 may also receive the incremental data replication request. The incremental data replication request is used to update the data block in the target object.

Further, after completing one replication task, the production array 20 may receive incremental data from a production host, to update the data block corresponding to the source object. To maintain data consistency at both ends, the production array 20 needs to send the incremental data to the disaster recovery array 30. The incremental data replication request includes the incremental data, the ID of the source object, and the logical address. Similar to the data replication request, the incremental data replication request is also periodically sent, and a period of the incremental data replication request may be the same as the remote replication period.

In an actual application, after receiving the incremental data, the production array 20 may store the incremental data as an incremental log. The incremental log may be described as "the ID of the source object+the logical address". When the replication task is triggered, the production array 20 reads the incremental data based on the incremental log, and sends the incremental data and the logical address to the disaster recovery array 30. When a plurality of incremental logs are stored in the production array 20, the production array 20 may send a plurality of incremental logs in one remote replication period to the disaster recovery array 30 at a time or separately in order to implement data consistency between the disaster recovery array end and the production array end.

For example, step 6. The production array 20 sends an incremental data replication request to the disaster recovery array 30, and after receiving the incremental data replication request, the disaster recovery array 30 searches for a to-be-updated target object based on an ID of a source object. For example, the ID of the target object may be the same as the ID of the source object. In this case, the disaster recovery array 30 may directly search for the target object based on the ID of the source object. In addition, in another implementation, the ID of the target object may be different from the ID of the source object. Therefore, the disaster recovery array 30 needs to search for the target object based on the ID of the source object and a correspondence between an ID of a locally stored target object and the ID of the source object.

Step 7. The disaster recovery array 30 determines a location of a to-be-updated data block in the target object based on a logical address carried in the incremental data replication request, and writes the data block carried in the incremental data replication request into the location. After writing the incremental data into the physical space corresponding to the target object, the disaster recovery array 30 generates and stores a correspondence between the target physical address and the logical address, and a correspondence between the target physical address and the ID of the target object.

Further, step 6 and step 7 may be performed by the processor 218 in the disaster recovery array 30.

The disaster recovery array 30 completes update of the target object using step 6 and step 7. In addition, when sending the incremental data to the disaster recovery array 30, the production array 20 does not need to send, to the disaster recovery array 30, the metadata that describes how to lay out the incremental data on the hard disk. Instead, the disaster recovery array 30 regenerates the layout metadata when writing the incremental data. Therefore, bandwidth overheads between the production array end and the disaster recovery array end are saved.

In an embodiment, the production array 20 may delete a particular file or a particular directory, or truncate a particular file. Consequently, an object in which the file or the directory is located is deleted, or some data of the object is deleted, reducing the physical space actually occupied by the object. In this case, the production array 20 also needs to synchronize, to the disaster recovery array 30, information about deleting the file or the directory or truncating the file.

For example, after receiving a deletion or truncation instruction, the production array 20 releases the data block of the logical address based on the logical address in the deletion or truncation instruction, and stores a deletion log. The deletion log may be described as "the ID of the source object+the logical address". When the replication task is triggered, the production array 20 reads data of a corresponding location based on the deletion log. If the data block corresponding to the location is released, valid data cannot be read. In this case, the production array replaces data content with a special mark (for example, the data content is marked as all 0 s). The mark indicates that the data block of the corresponding logical address needs to be released, and the data including the special mark, the logical address, and the ID of the source object are sent to the disaster recovery array 30.

The disaster recovery array 30 detects that the received data includes the special mark, determines a to-be-changed target object based on the ID of the source object, and releases the data block of the logical address of the target object in order to delete the object or delete some data of the object, achieving an effect of deleting the file or the directory and truncating the file in a target file system.

In addition, this embodiment may be further used for data replication between a source file system and the target file system in an array. In a specific implementation, a controller in the array (refer to a structural diagram shown in FIG. 2) may be used for execution.

For example, when an object in the source file system needs to be backed up to the target file system, the controller determines whether there is a target object having a same ID as the source object in the target file system. If there is no target object having the same ID as the source object in the target file system, a target object is created, an ID of the target object is the same as an ID of the source object, and the target object corresponds to one or more segments of physical space in the hard disk. Different from an embodiment shown in FIG. 4, in terms of backup in the array, both physical space corresponding to the source object and physical space corresponding to the target object are located in the array. In the embodiment shown in FIG. 4, due to data replication between arrays, the physical space corresponding to the source object is located in the production array, and the physical space corresponding to the target object is located in the disaster recovery array. After the target object is created, the controller writes the data block corresponding to the source object into the physical space corresponding to the target object.

For example, the controller may write the data block into the physical space corresponding to the target object based on the logical address of the data block in the source object in order to ensure that the location of the data block stored in the target object is the same as the location of the data block stored in the source object.

For another step, for example, when data corresponding to the source object is updated, the incremental data also needs to be backed up to the target object. A specific implementation is similar to the embodiment shown in FIG. 4, and details are not described herein again.

In some data backup technologies based on file semantics, the source file system records the received data into a log. The log records all file semantics writing operations and writing data in sequence, for example, creating the file, deleting the file, moving the file, writing data into the file, modifying a file attribute, creating the directory, and deleting the directory. The file semantics writing operation has sequential dependence. For example, before the file is created, the directory of the file first needs to exist. Therefore, the directory first needs to be created, and then the file is created. Due to existence of sequential dependence, backup needs to be performed according to a series of rules, making it relatively complex to implement a data backup technology that is based on the file semantics. Alternatively, a snapshot is periodically created for the source file system, and it is derived, by comparing a difference between two snapshots, which file semantics writing operation and writing data occur in the source file system between two snapshots. Then, a background task obtains the record and sends the record to the target file system in file form semantics writing operation. The target file system performs the writing operation in a manner that is similar to re-execution of an application program in the file system of the disaster recovery array. In this manner, when executing file semantics replication, the disaster recovery array needs to perform a corresponding operation (such as an open operation or a close operation) on each file, causing extra overheads and relatively low backup efficiency. However, in an implementation of this embodiment of the present disclosure, the sequential dependence between writing operations is not considered. The data block corresponding to the object only needs to be backed up from the source file system to the target file system. There is no dependence between data blocks, and a sequence of the backup data blocks is not considered, reducing solution complexity. In addition, during backup, reading and writing the object may be directly performed, and no additional operation (such as the open operation or the close operation) needs to be performed, reducing system overheads and improving backup efficiency.

In addition, during backup based on block semantics, the file system needs to be constructed on a volume. The volume provides an access interface and address space of block semantics, and the semantics only reads a segment of address and writes a segment of address and does not include a complex file operation. Therefore, the backup based on the block semantics is essentially implemented using a volume replication method. In this method, a snapshot is periodically created for a source volume in the production array and comparison is performed to check which data block is changed between two snapshots. Then, a changed data block and an address of the changed data block are obtained and sent to the target file system. The target file system writes the data block into a target volume having a same address. However, the backup based on the block semantics needs to depend on a basic architecture of constructing the file system on the volume, and if the backup is not based on this architecture, this technology cannot be used. In this embodiment of the present disclosure, dependence that the file system needs to be constructed on the volume is removed, and file backup can be implemented regardless of the physical space on which the file system is constructed.

It should be noted that the source file system and the target file system in the foregoing two paragraphs may be two file systems in one array, or may be file systems in two arrays respectively.

Finally, it should be noted that the foregoing embodiments are merely intended for describing the technical solutions of the present disclosure, rather than limiting the present disclosure.

What is claimed is:

1. A method for replicating objects in a storage system, the method comprising:
    storing, by a source site in the storage system and in first data blocks of the source site, a first copy of a source object comprising a data bucket configured to store data of the source object;
    storing, by the source site, first metadata of the data of the source object, wherein the first metadata indicates a relationship among the first data blocks;
    replicating the data of the source object to a target site in the storage system when a replicating task is triggered by:
        storing, by the target site and in second data blocks of the target site, the data of the source object as a second copy of the source object; and
        storing, by the target site, second metadata of the data of the source object, wherein the second metadata is different than the first metadata and indicates a relationship among the second data blocks, and
    wherein the first metadata is not copied to the target site such that an ordering of the second data blocks is different than an ordering of the first data blocks.

2. The method of claim 1, further comprising:
    detecting, by the source site, incremental data to be written into the source object to update the source object;
    sending, by the source site, the incremental data to the target site; and
    writing, by the target site, the incremental data into the second copy of the source object.

3. The method of claim 2, further comprising periodically sending the incremental data to the target site.

4. The method of claim 1, further comprising:
    receiving, by the source site, a delete request from a host requesting to delete the source object;
    deleting, by the source site, the data of the source object that is included in the first copy of the source object; and
    writing, by the source site, a deleting mark into the first copy of the source object by writing the deleting mark into one or more of the first data blocks, wherein the deleting mark indicates that the data of the source object that is included in the first copy of the source object is invalid.

5. The method of claim 4, further comprising:
    sending, by the source site, the deleting mark to the target site; and deleting, by the target site, the data of the source object that is included in the second copy of the source object based on the deleting mark.

6. The method of claim 1, wherein the data bucket comprises a file.

7. The method of claim 1, wherein the data bucket comprises a directory.

8. A storage system comprising:
a target site; and
a source site coupled to the target site and configured to:
store, in first data blocks of the source site, a first copy of a source object comprising a data bucket configured to store data of the source object;
store first metadata of the data of the source object, wherein the first metadata indicates a relationship among the first data blocks; and
replicate the data of the source object to the target site when a replicating task is triggered,
wherein the target site is configured to:
store, in second data blocks of the target site, the data of the source object as a second copy of the source object; and
store second metadata of the data of the source object, wherein the second metadata is different than the first metadata and indicates a relationship among the second data blocks, and
wherein the first metadata is not copied to the target site such that an ordering of the second data blocks is different than an ordering of the first data blocks.

9. The storage system of claim 8, wherein the source site is further configured to:
detect incremental data to be written into the source object to update the source object; and
send the incremental data to the target site, and
wherein the target site is further configured to write the incremental data into the second copy of the source object.

10. The storage system of claim 9, wherein the source site is further configured to periodically send the incremental data to the target site.

11. The storage system of claim 8, wherein the source site is further configured to:
receive a delete request from a host requesting to delete the source object;
delete the data of the source object that is included in the first copy of the source object; and
write a deleting mark into the first copy of the source object, wherein the deleting mark indicates that the data of the source object that is included in the first copy of the source object is invalid.

12. The storage system of claim 11, wherein the source site is further configured to send the deleting mark to the target site, and wherein the target site is further configured to delete the data of the source object that is included in the second copy of the source object based on the deleting mark.

13. The storage system of claim 8, wherein the data bucket comprises a file or a directory.

14. A computer program product comprising computer-executable instructions that are stored on a non-transitory computer-readable storage medium and that, when executed by a processor, cause a storage system to:
store, using a source site in the storage system and in first data blocks of the source site, a first copy of a source object comprising a data bucket configured to store data of the source object;
store, using the source site, first metadata of the data, wherein the first metadata indicates a relationship among the first data blocks; and
replicate the data of the source object to a target site in the storage system when a replicating task is triggered by:
storing, using the target site and in second data blocks of the target site, the data of the source object as a second copy of the source object; and
storing, using the target site, second metadata of the data of the source object, wherein the second metadata is different than the first metadata and indicates a relationship among the second data blocks, and
wherein the first metadata is not copied to the target site such that an ordering of the second data blocks is different than an ordering of the first data blocks.

15. The computer program product of claim 14, wherein the computer-executable instructions further cause the storage system to:
detect, using the source site, incremental data to be written into the source object to update the source object;
send, using the source site, the incremental data to the target site; and
write, using the target site, the incremental data into the second copy of the source object.

16. The computer program product of claim 15, wherein the computer-executable instructions further cause the storage system to periodically send, using the source site, the incremental data to the target site.

17. The computer program product of claim 14, wherein the computer-executable instructions further cause the storage system to:
receive, using the source site, a delete request from a host requesting to delete the source object;
delete, using the source site, the data of the source object that is included in the first copy of the source object; and
write, using the source site, a deleting mark into the source object indicating that the data of the source object that is included in the first copy of the source object is invalid.

18. The computer program product of claim 17, wherein the computer-executable instructions further cause the storage system to:
send, using the source site, the deleting mark to the target site, and
delete, using the target site, the data of the source object that is included in the second copy of the source object based on the deleting mark.

19. The computer program product to claim 14, wherein the data bucket comprises a file.

20. The computer program product to claim 14, wherein the data bucket comprises a directory.

* * * * *